No. 740,283. Patented September 29, 1903.

UNITED STATES PATENT OFFICE.

GEORG KLENK, OF HAMBURG, GERMANY.

PROCESS OF MAKING TANNIN EXTRACTS.

SPECIFICATION forming part of Letters Patent No. 740,283, dated September 29, 1903.

Application filed April 3, 1903. Serial No. 150,989. (No specimens.)

*To all whom it may concern:*

Be it known that I, GEORG KLENK, doctor of philosophy, a citizen of the German Empire, residing at 20 Billhörnerkanalstrasse, Hamburg, Germany, have invented a new and Improved Process for the Manufacture of Tannin Extracts Soluble in Cold Water, of which the following is a specification.

My present invention relates to an improvement in the process for the manufacture of tannin extracts soluble in cold water, for which I have obtained United States Patent No. 720,157. According to the said process tannin extracts are obtained which while being sufficiently discolorized readily dissolve in cold water, and thereby form a perfectly clear solution. The said process consists in treating the crude tannin solution with alumina sulfate and subsequently with sodium bisulfite. Now I have found that the yield obtainable with the said process may be efficiently increased by performing the said treatment of the crude tannin solution under a suitably high pressure, which corresponds to a temperature of about 120° to 130° Celsius, preferably. Furthermore, the application of pressure from two to three atmospheres allows to dispense with a cooling of the liquor, which cooling has been proved to be highly advantageous when working the process without pressure. After having sufficiently concentrated the extract obtained by my former process above referred to the said extract is finally treated under the above-mentioned pressure for about one-half to one hour.

On practicing my invention I proceed as follows: For example, five thousand liters of the hot tannin extracts coming from the extractors are agitated with a solution of four kilograms of solid alumina sulfate in a vat, whereby the liquor is discolorized, after which fifteen to twenty kilograms of sodium-bisulfite of 38° to 40° Baumé are added while constantly stirring. Finally, the said vat is closed and the contents heated to a temperature of about 120° to 130° Celsius and kept at this temperature for one-half to one hour.

Having thus described my invention, I claim—

An improved process for the manufacture of tannin extracts soluble in cold water, which process consists in treating the crude tannin solution first with alumina sulfate and subsequently with sodium bisulfite and finally heating the mixture in a closed receptacle to a temperature between 120° and 130° Celsius and pressure of two to three atmospheres, substantially as set forth.

In testimony that I claim the foregoing as my invention I have signed my name in presence of two subscribing witnesses.

GEORG KLENK.

Witnesses:
E. H. L. MUMMENHOFF,
OTTO W. HELLMRICH.